(12) United States Patent
Mori et al.

(10) Patent No.: US 6,659,471 B2
(45) Date of Patent: Dec. 9, 2003

(54) GASKET FOR SEALING TRI-FACE AREA

(75) Inventors: Shingo Mori, Osaka (JP); Kazuyuki Geshi, Osaka (JP); Kazuya Hiroshima, Osaka (JP); Kazuya Yoshijima, Okazaki (JP); Masao Murayama, Toyota (JP); Takashi Asano, Anjyo (JP)

(73) Assignees: Nippon Gasaket Co., Ltd., Osaka (JP); Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 10/083,554

(22) Filed: Feb. 27, 2002

(65) Prior Publication Data

US 2002/0117812 A1 Aug. 29, 2002

(30) Foreign Application Priority Data

Feb. 27, 2001 (JP) ........................... 2001-051362

(51) Int. Cl.[7] ................................. F02F 11/00
(52) U.S. Cl. ........................... 277/592; 277/922
(58) Field of Search ..................... 277/592, 594, 277/598, 316, 922, 904

(56) References Cited

U.S. PATENT DOCUMENTS

| | | | | |
|---|---|---|---|---|
| 5,222,745 A | * | 6/1993 | Akbar et al. | 277/594 |
| 5,275,420 A | * | 1/1994 | Rodenkirch | 277/313 |
| 5,727,791 A | * | 3/1998 | Weiss et al. | 277/592 |
| 6,003,878 A | * | 12/1999 | Noble et al. | 277/596 |
| 6,056,296 A | * | 5/2000 | Ii | 277/595 |
| 6,349,944 B1 | * | 2/2002 | Sugiyama et al. | 277/591 |

FOREIGN PATENT DOCUMENTS

| | | | | |
|---|---|---|---|---|
| JP | 60-61561 | | 4/1985 | |
| JP | 61-148962 | | 9/1986 | |
| JP | 02066848 A | * | 3/1990 | H01M/2/08 |
| JP | 2000-73859 | | 3/2000 | |
| JP | 2000-73860 | | 3/2000 | |
| JP | 2000130258 A | * | 5/2000 | F02F/11/00 |

OTHER PUBLICATIONS

"Sealing Construction In Head Gasket"; *Toyota Technical Bulletin*; Publication No. 10011; issued on Oct. 29, 1999.

* cited by examiner

*Primary Examiner*—William L. Miller
(74) *Attorney, Agent, or Firm*—Browdy and Neimark, P.L.L.C.

(57) ABSTRACT

A gasket is disclosed, which is adapted for the use in sealing of a tri-face area where a cylinder block, cylinder head and timing-chain housing meet together and come into abutment against one another. With the gasket of this invention, a deposit of bonding agent is applied on an end lug of a solid gasket material to improve the adhesive property and close adherence of the solid gasket material with a fluid gasket material that is filled in the tri-face area. The fluid gasket material charged in the tri-face area is securely fastened to the solid gasket material through the bonding agent. The end lug of the solid gasket material on which the bonding agent is applied is exposed to the tri-face area where both the cylinder head and the cylinder block are cut at their confronting edges to form bevels.

8 Claims, 4 Drawing Sheets

GASKET FOR SEALING TRI-FACE AREA

BACKGROUND OF THE INVENTION

1. Field of the Invention

The present invention relates to a gasket used in the automobile and so on, especially in the automotive engine and, more particularly, to a gasket adapted for the use in concurrent sealing of three set of mating surfaces at an area, called tri-face area herein, where three engine components, for example cylinder block, cylinder head and chain block, or cylinder block, oil pan and front cover meet together and come into abutment against one another when assembled to complete the automotive engine.

2. Description of the Prior Art

With the automotive engine of the type in which a timing-chain housing is attached to the combined cylinder block and cylinder head, a tri-face area is commonly found where the cylinder block, cylinder head and timing-chain housing meet together and come into abutment against one another. In engine construction in which an oil pan is installed on the bottom of the cylinder block, moreover, the tri-face area is formed where all the oil pan, cylinder block and a front cover or flywheel housing are brought into abutment one another. Conventionally any gasket of peculiar construction has been developed to seal concurrently joints between any mating surfaces in the tri-face area. For example, a gasket making sure of secure sealing at the tri-face area has been well known in which a fluid gasket so called FIPG: Fluid In Place Gasket is employed along with a solid gasket made in some form conforming to the tri-face area.

Disclosed in Japanese Utility Model laid-Open No. 61561/1985 is an example of the prior sealing means, in which a plate-like gasket is placed and squeezed between first and second components, while a fluid gasket is arranged between the mating surfaces at a tri-face area where a third component comes into abutment against both the first and second components stated earlier. The plate-like gasket is made in any one of stepped, inclined and undulated contours along an edge thereof facing the fluid gasket, thus partially biting into the fluid gasket at peaks extending towards the third component in the direction across the thickness of the fluid gasket, while not reaching the fluid gasket at recessions retreating away from the third component.

Japanese Utility Model Laid-Open No. 148962/1986 discloses a gasket for a tri-face area, in which a gasket plate with corrugated bead is clamped between the first and second components while a fluid gasket material is placed between the mating surfaces at a tri-face area where a third component comes into abutment against both the first and second components, and a gasket material apart from the fluid gasket material is charged nearby a bead end at a gasket edge in the tri-face area.

Japanese Patent Laid-Open No. 73859/2000 discloses a sealing means for an engine in which a timing-chain housing is joined with tightening bolts onto the sides of a cylinder block and a cylinder head that are tightened together through a head gasket. With the prior sealing means stated just above, both the cylinder head and the cylinder block are partially recessed on the sides thereof, while the gasket prior to placing it between the mating surfaces of the cylinder head and the cylinder block is applied with a deposit of fluid gasket material in such a way that the fluid gasket material fills the recesses when the cylinder head and the cylinder block are joined together, thus making sure of reliable sealing at the tri-face area.

Another prior sealing means to join a timing-chain housing over both the sides of the cylinder head and the cylinder block is disclosed in Japanese Patent Laid-Open No. 73860/2000, in which a soft sealant such as fluid gasket, and so on is placed in bounds where all the cylinder head, cylinder block and the side wall of the timing-chain housing meet together and come into abutment against one another.

A series of silicon compounds has been predominantly used for the prior fluid gasket applied at the tri-face area as recited earlier. Nevertheless, this type of fluid gasket by nature has no adhesive property and, even with any adhesive property, would be too sparse in adhesive property or bonding ability to make sure of safe sealing performance. With the prior gaskets of the type stated earlier, accordingly, the conventional fluid gasket is commonly poor in adhesive property or bonding characteristic with the solid gasket and tends to easily come off the solid gasket owing to any vibration or any thermal load that might raise the repeated thermal expansion/shrinkage. This causes oil leakage at the tri-face area in the engine construction, raising a major problem of spoiling reliability in the aspect of the sealing performance at the tri-face area. This major problem remaining unsolved in the prior gaskets teaches that the only sealing means in which the fluid gasket is simply combined with the solid gasket, even though refined by adding any somewhat sophisticated process of charging or applying a deposit of fluid gasket material to the tri-face area at the time of assembling, is quite tough to make sure of the sealing performance or reliability enough to justify any increase in production steps and/or costs.

SUMMARY OF THE INVENTION

It is the primary object of the present invention to provide a gasket in which a fluid gasket material is used along with a solid gasket material to seal a tri-face area where three engine components meet together and come into abutment against one another, and more particular to provide the improvement in the gasket of the type recited earlier, in which adhesive property or bonding ability between the fluid and solid gasket materials is made better to get the sealing performance up to more reliability.

The present invention is concerned with a gasket adapted to be disposed in a construction that is comprised of a first component, a second component confronting the first component through a solid gasket material interposed between the first and second components, and a third component arranged in opposition to flush sides of the first and second components, all the first, second and third components meeting together and coming into abutment against one another to form a tri-face area; the improvement characterized in that a fluid gasket material is filled in the tri-face area while a deposit of bonding agent is applied on an end of the solid gasket material, which is placed in the tri-face area, and the fluid gasket material is joined to the solid gasket material with the bonding agent.

According to one aspect of the present invention, a gasket is disclosed in which the end of the solid gasket material on which the bonding agent is applied is exposed out of mating surfaces of the first and second components into the tri-face area.

According to another aspect of the present invention, a gasket is disclosed in which the bonding agent is applied on either a tip face or at least one side on the end of the solid gasket material.

According to another aspect of the present invention, a gasket is disclosed in which the end of the solid gasket material exposed out of the mating surfaces of the first and second components is placed in an area where both the first and second components are cut at their confronting edges to form bevels opposite to one another.

According to another aspect of the present invention, a gasket is disclosed in which the bonding agent is applied previously to the end of the solid gasket material, preparatory to installation of the solid gasket material into the construction.

According to another aspect of the present invention, a gasket is disclosed in which the bonding agent and/or a primer to be applied on the solid gasket material are applied with either dipping or printing process.

According to a further another aspect of the present invention, a gasket is disclosed in which the first component is a cylinder block, the second component is a cylinder head to be joined to the cylinder block and the third component is a timing-chain housing to be fastened to both the cylinder block and the cylinder head. As an alternative, a gasket is provided in which the first component is a cylinder block, a second component is a front cover fastened to the cylinder block, and the third component is an oil pan to be joined together to the cylinder block.

The gasket constructed as stated earlier may be kept safely against any cracking that might otherwise occur between the solid gasket material and the fluid gasket material at the tri-face area where the three components meet together and come into abutment against one another. Thus, the present invention makes sure of improvement in adhesive property and close adherence of the solid gasket material with the fluid gasket material, making better the sealing performance at the tri-face area in the construction. The bonding agent is applied on the exposed end of solid gasket material, whether partially or throughout of the exposed end. As an alternative, any primer for surface pretreatment may be applied preparatory to the application of the bonding agent to the solid gasket material. The primer having any adhesive property may be used as the bonding agent alternatives in return for the bonding agent.

With the tri-face gasket constructed as stated earlier, the bonding agent deposited on the solid gasket material helps make sure of joining securely the solid gasket material to the fluid gasket material filled in the tri-face area, thus improving distinctly the adhesive property and close adherence of the fluid gasket material with the solid gasket material, compared with the prior tri-face gasket in which the fluid gasket material comes into engagement with the solid gasket material with no bonding agent applied on the solid gasket material. The tri-face gasket of the present invention realizes the perfect sealing at the tri-face area, preventing any oil leakage at the tri-face area. Thus, the present invention provides the tri-face gasket high in reliability of sealing performance compared with the prior gasket with no bonding agent, thus expected to find increased application in various kinds of sealing construction.

Other aspects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
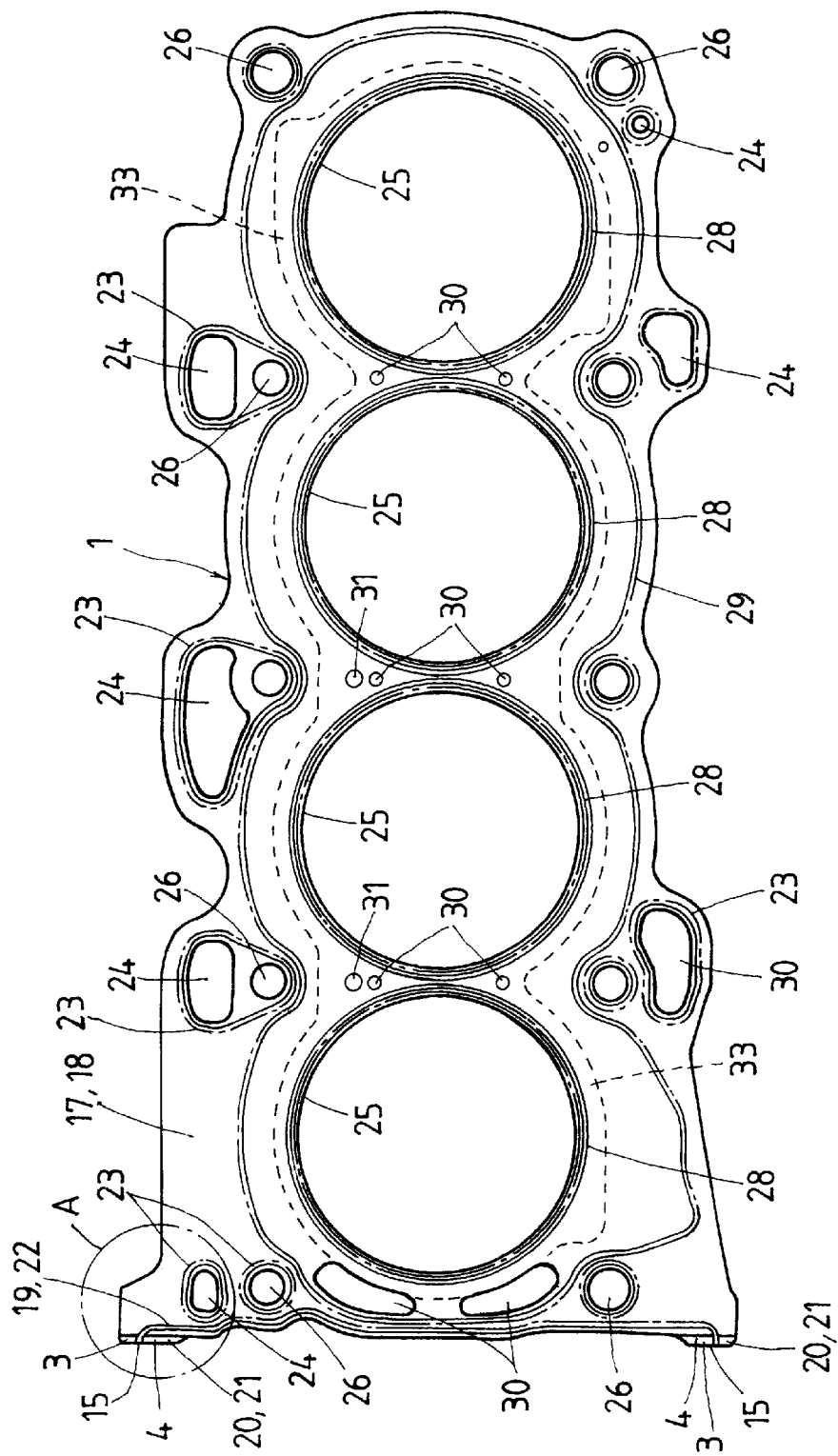
FIG. 1 is a top plan view showing a preferred embodiment of a tri-face gasket in accordance with the present invention.
Figure 2:
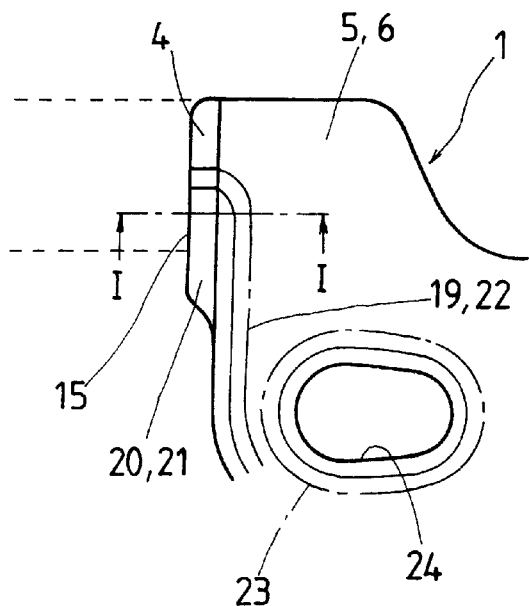
FIG. 2 is a fragmentary enlarged top plan view of a tri-face construction encircled with A in FIG. 1, which conforms to a tri-face area where all three components meet together and come into abutment against one another.
Figure 3:
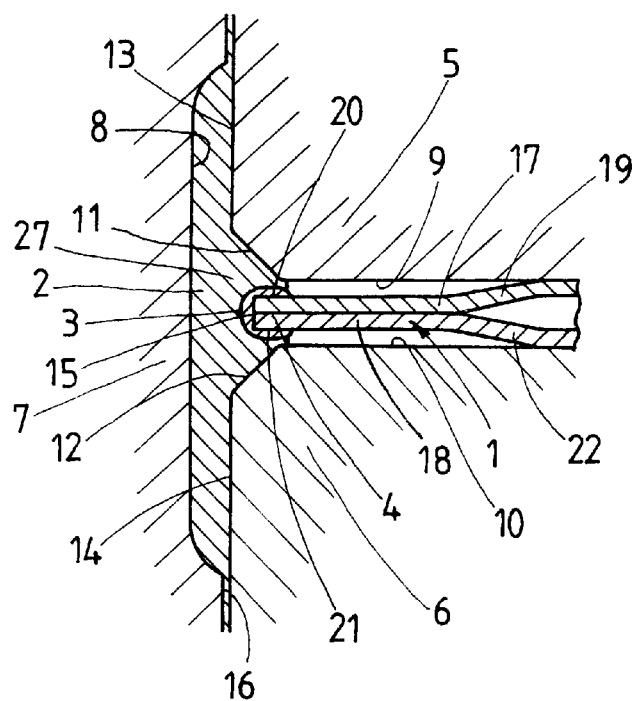
FIG. 3 is a fragmentary sectional view of an embodiment of the tri-face construction of the gasket and taken on a plane along the line I—I of FIG. 2.

A tri-face gasket according to the present invention will be in detail explained below with reference to the accompanying drawings showing some embodiments of the present invention. Referring first to FIGS. 1 to 3 there is shown a preferred embodiment of a tri-face gasket of the present invention.

The tri-face gasket of the present invention is suitable for use in any construction having therein a tri-face area 27 where three components: a first component, a second component mating with the first component through a solid gasket material 1 interposed between them, and a third component joined together to end surfaces of the first and second components all meet together and come into abutment against one another. The tri-face gasket of the present invention has a feature that a fluid gasket material 2 filled in the tri-face area 27 is joined to the solid gasket material 1 with a deposit of bonding agent 3 applied on an end lug 4 of the solid gasket material 1, which extends into the tri-face area 27. The tri-face gasket stated earlier is envisaged to use it for, for example an engine construction as shown in FIGS. 1 to 5, which is composed of a cylinder block 6 as the first component, a cylinder head 5 as the second component to be mated with the cylinder block 6, and a timing-chain housing 7 as the third component to be fastened on sides of the cylinder block 6 and the cylinder head 5. As an alternative, although not shown, the present tri-face gasket is allowed to use it for another engine construction made up of a cylinder block as the first component, a front cover as the second component to be attached to the cylinder block, and an oil pan as the third component to be joined together to both the cylinder block and the front cover.

The tri-face gasket according to the present invention is available for, especially, any construction such as an engine construction where the tri-face area 27 is inevitable therein and not only the solid gasket material 1 but the fluid gasket material 2 is used to seal the tri-face area 27, and moreover it has a feature that the solid gasket material 1 is applied with a deposit of bonding agent 3 at an end lug 4 thereof, which is exposed in the tri-face area 27.

According to the embodiment in FIG. 1, the tri-face gasket is shown as a head gasket adapted for an engine construction with timing-chain housing, and chiefly comprised of two sheets of metallic beaded plate 17, 18 and a shim plate 33 spreading only around an aperture 25 aligning with a cylinder bore, which are all stacked in a laminate. This tri-face gasket is designed to use it for sealing a tri-face area 27 where the cylinder head 5, the cylinder block 6 and the timing-chain housing 7 meet together and come into abutment against one another. Thus, this tri-face gasket includes a solid gasket material 1 to be placed between mating surfaces of the cylinder head 5 and the cylinder block 6 to provide a head gasket squeezed between the mating surfaces with tightening bolts, and a fluid gasket material 2 to be placed in the tri-face area 27 where end surfaces 13, 14 of the cylinder head 5 and the cylinder block 6, and an end surface 16 of the timing-chain housing 7 meet together and come into abutment against one another.

Referring to FIG. 2, which is an enlarged plan view of a zone encircled with a letter A in FIG. 1, there is shown partially an end lug 4 of the solid gasket material 1, placed in the tri-face area 27. With the embodiment shown in FIGS. 1 and 2, the solid gasket material 1 is made in a form the end lug 4 of which somewhat juts out into the tri-face area 27. As seen from FIG. 3 showing a fragmentary sectional view taken on a plane along the line I—I of FIG. 2, this embodiment of the gasket according to the present invention is shown as being applied in a clearance left in the engine construction after the mating surfaces 9, 10 of the cylinder head 5 and the cylinder block 6 have come into abutment against the end surface 16 of the timing-chain housing 7. That is to say, the gasket is envisaged to find its application in a clearance of T-shape lying sideways, which might occur in the tri-face area where the timing-chain housing 7 comes into abutment against both the cylinder head 5 and the cylinder block 6, with the mating surfaces 9, 10 of the cylinder head 5 and the cylinder block 6 being kept in perpendicular to the end surface 16 of the timing-chain housing 7. Meanwhile, although clearances left between the solid gasket material 1 or the beaded plates 17, 18 and the mating surfaces 9, 10 are illustrated exaggeratedly in FIGS. 3 to 5, but in reality there are few of the clearance under the condition where the cylinder head 5 and the cylinder block 6 are tightened together.

The solid gasket material 1 of the tri-face gasket is really comprised of beaded plates 17, 18. Besides the apertures 25 formed in alignment with the combustion holes in the cylinder block 6, the beaded plates 17, 18 are made with a variety of other holes such as oil holes 24, bolt holes 26, coolant holes 30, positioning holes 31, and so on. Moreover, the beaded plates 17, 18 making up the solid gasket material 1 are each made with a full bead 28 extending circumferentially of the associated aperture 25 to surround around the aperture 25, and a half bead 29 extending along any peripheral area of the gasket. Moreover, the beaded plates 17, 18 have other half beads 19, 22 at a marginal region thereof, nearby that both the cylinder head 5 and the cylinder block 6 may meet with the timing-chain housing 7. The various holes of oil holes 24, bolt holes 26 and coolant holes 30 formed in the beaded plates 17, 18, rather than apertures 25 are all encircled with half beads 23, one to each bead.

With the tri-face gasket constructed as stated earlier, the solid gasket material 1 is preformed to have an end lug 4, while both the cylinder head 5 and the cylinder block 6 are cut or shaped at their confronting edges to form bevels 11, 12. The solid gasket 1, when installed in the engine construction, is placed between the cylinder head 5 and cylinder block 6, with the end lug 4 being exposed out from the mating surfaces 9, 10 of the engine components 5, 6 into an open zone defined between the opposing bevels 11, 12. In other wards, the end lug 4 of the gasket material 1 in the tri-face area is made up of an tip face 15 and sides 20, 21 opposite each other, which jut out from the clearance between the mating surfaces 9, 10 of the engine components 5, 6 to be placed in the open zone between the opposing bevels 11, 12.

At the tri-face area 27, the end surface 16 of the timing-chain housing 7 is partially removed to form a relatively shallow recess 8 that comprises a part of the tri-face area 27, providing a clearance to be filled with the fluid gasket material 2. The fluid gasket material 2 having a desired width and a desired height is applied on the end surface 16 of the timing-chain housing 7, which will come into abutment against the cylinder head 5 and the cylinder block 6, and also charged around the bonding agent 3 deposited on the end lug 4 of the solid gasket material 1 thereby to fill the tri-face area 27 with the fluid gasket material 2. The clamping force squeezes the timing-chain housing 7 against both the cylinder head 5 and the cylinder block 6. The fluid gasket material 2 is then forced towards the end lug 4 exposed in the tri-face area 27, filling any irregularities in the tri-face area 27 while coming into tight adhesion with the bonding agent 3 having been applied previously, thereby finishing the secure seal in the tri-face area 27.

With the embodiment stated here, the bonding agent 3 is deposited on the end lug 4 of the solid gasket material 1 in a way exposed out of between the mating surfaces 9, 10 of the cylinder head 5 and the cylinder block 6 into the tri-face area 27. Although the bonding agent 3 is shown in FIG. 3 as being deposited on the tip face 15 and both the opposite sides 20, 21 of the end lug 4 of the solid gasket material 1, it will be appreciated that the bonding agent may be applied on the tip face 15 and only any one of the opposite sides 20, 21.

According to the basic aspect of the tri-face gasket constructed as stated earlier, a deposit of any bonding agent 3 is applied to any suitable location on the end lug 4 of the solid gasket material 1, which juts into the tri-face area 27, at the time of or at the earlier stage of installation of the solid gasket material 1 between the first component or the cylinder head 5 and the second component or the cylinder block 6. Then, the fluid gasket material 2 is made adhered to the bonding agent 3. Thus, the solid gasket material 1 is interposed between the first component or the cylinder head 5 and the second component or the cylinder block 6 so as to place the end lug 4 thereof in the tri-face area 27. Then, the third component or the timing-chain housing 7 is last assembled together with the cylinder head 5 and the cylinder block 6, whereby the fluid gasket material 2 is allowed to fill the tri-face area 27 and make tight adhesion to the solid gasket material 1 with the bonding agent 3.

With the tri-face gasket of the present invention installed in the engine construction assembled as stated earlier, the bonding agent 3 makes sure of firm adhesion or tight engagement of the solid gasket material 1 with the fluid gasket material 2, thus helping ensure perfect prevention of any oil leakage, which might otherwise occur at the tri-face area 27. Application of the bonding agent 3 on to solid gasket material 1 may be realized by either dipping or printing process. The bonding agent 3 is deposited previously on the end lug 4 of the solid gasket material 1 prior to combining the solid gasket material 1 with any associated component. Any primer, not shown, may be moreover applied on the solid gasket material 1 by either dipping or printing process as with the deposition of the bonding agent 3.

Deposition of the bonding agent 3 on the solid gasket material 1 is practiced by, for example repeated application of the bonding agent 3 on the confronting end lugs 4 of the beaded plates 17, 18 with using a pad applicator 32 as illustrated in FIG. 6(a). The beaded plates 17, 18 applied with the bonding agent 3 then get dried in a drying oven. The beaded plates 17, 18 are moreover laid one on top of another in a laminate and joined together by means of a caulking process. As an alternative, the beaded plates 17, 18 are first stacked and then joined together by the caulking process into a laminate preparatory to depositing the bonding agent 3 on the solid gasket material 1, as shown in FIG. 6(b). Further, the beaded plates 17, 18 is deposited with the bonding agent 3 at their end lugs 4 by repeat application of the bonding agent 3 by means of the pad applicator 32, followed by loaded in the drying oven to dry the bonding agent 3 deposited on the end lugs 4 of the beaded plates 17, 18.

Deposition of the bonding agent 3 on the solid gasket material 1 recited earlier does not need to use any masking treatment, screen, stencil plate, and so on. The number of times a pad 34 of the pad applicator 32 is pushed against the end lugs 4 may be selected suitably within a range of from one to many times. Moreover, the period of time per one pushing operation is preferably not more than 15 seconds. In case shown in FIG. 6(a), the bonding agent 3 is applied on the tip face 15 and any one side 20(21) of each of the beaded plates 17, 18 of the solid gasket material 1. It will be of course that the pad applicator 32 is allowed to have two pads 34 for applying the bonding agent 3 on the solid gasket material 1. In addition, minor amounts of the bonding agent deposited on only any one side of each end lug 4 of the solid gasket material 1 may be allowed to spread out to another side. The deposit of the bonding agent 3 gets dried for less than 10 minutes at any temperature ranging from ordinary temperature to 150° C.

Figure 4:
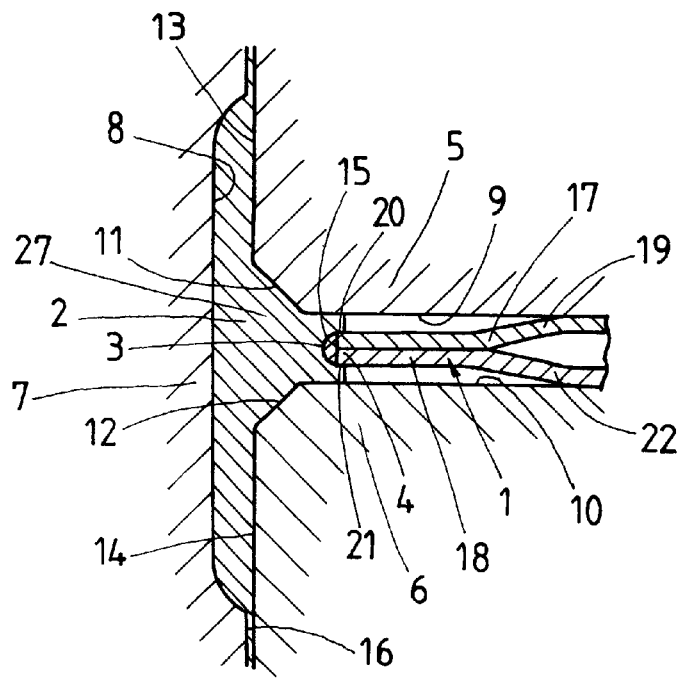
FIG. 4 is a fragmentary sectional view of another embodiment of the tri-face construction of the gasket and taken on a plane along the line I—I of FIG. 2.

Referring next to FIG. 4, there is shown another embodiment of the tri-face gasket of the present invention. With this second embodiment, the deposit of bonding agent 3 on the end lug 4 of the solid gasket material 1 is applied on only the tip face 15 of the end lug 4 of the solid gasket material 1, but not applied on both the sides 20, 21 of the end lug 4. The tip face 15 of the end lug 4 of the solid gasket material 1, although being placed in the tri-face area 27, terminates away from the confronting bevels 11, 12 of the cylinder head 5 and the cylinder block 6 so that only the tip face 15 of the end lug 4 of the solid gasket material 1 is exposed to the tri-face area 27 out of the clearance between the mating surfaces 9, 10. The bonding agent 3 is applied on only the tip face 15 of the solid gasket material 1. In the embodiment discussed now, as the exposed portion or the tip face 15 of the solid gasket material 1 is arranged in a way getting backed somewhat deep, the fluid gasket material 2 has to be filled enough to reach the clearance left between the mating surfaces 9, 10 of the cylinder head 5 and the cylinder block 6. That is to say, this embodiment requires relatively much amount of fluid gasket material 2. Thus, the second embodiment becomes far much in sealing area and volume of the fluid gasket material 2, compared with the embodiment in FIG. 3. This results in making it possible to ensure the complete sealing effect even though only the small tip face 15 of the solid gasket material 1 is placed in the tri-face area 27 and also the deposit of the bonding agent 3 is limited to only the small tip face 15.

Figure 5:
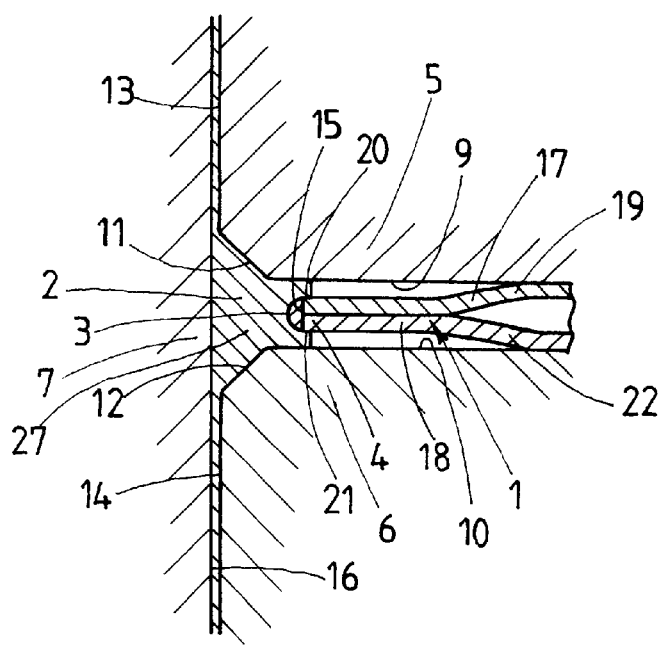
FIG. 5 is a fragmentary sectional view of a further another embodiment of the tri-face construction of the gasket and taken on a plane along the line I—I of FIG. 2.

Referring to FIG. 5, there is illustrated a further another embodiment of the tri-face gasket of the present invention. With this third embodiment, the end surface 16 of the timing-chain housing 7 is made with no recess, but remaining even. The construction no recess is made on the end surface 16 of the timing-chain housing 7 can not afford to allow the end lug 4 of the solid gasket material 1 to jut out to the bevels 11, 12 as with the embodiment shown in FIG. 3. As a result, the exposed portion or the tip face 15 of the solid gasket material 1 is arranged in a way getting backed somewhat deep. The fluid gasket material 2 is charged enough to reach the clearance left between the mating surfaces 9, 10 of the cylinder head 5 and the cylinder block 6. Correspondingly, the fluid gasket material 2 becomes relatively much in needed amount or volume. This much amount of the fluid gasket material 2 helps make sure of the complete sealing effect even though the deposit of the bonding agent 3 is limited to only the small tip face 15 which is placed in the tri-face area 27.

While the metallic plates of the solid gasket material 1, although not shown, are covered with a coating layer of common rubber and the like, the bonding agent 3 is made of any substance that can produce effective functions on adhesive performance or close adherence, whether any coating is applied on the solid gasket material 1 or not. The bonding agent 3 may exhibit superior adhesive performance or close adherence with, for example any of metals, rubbers and fluid gaskets 2. For example, an adhesive of acrylics is recommended for the bonding agent 3. It is optional whether the primer is used or not prior to application of the bonding agent 3. Moreover, the area where the bonding agent 3 is deposited needs not be just restricted to the extent exposed when the solid gasket material 1 is installed between the mating surfaces, as with the embodiments shown in FIGS. 3 and 4, but allowed to spread over the end lug towards the half bead. Although application of the primer or the bonding agent 3 on the solid gasket material 1 may be performed with the dipping or printing process, notably the press-deposition using the pad applicator as shown in FIG. 6 is most preferable because of a simple and easy way.

Figure 6:
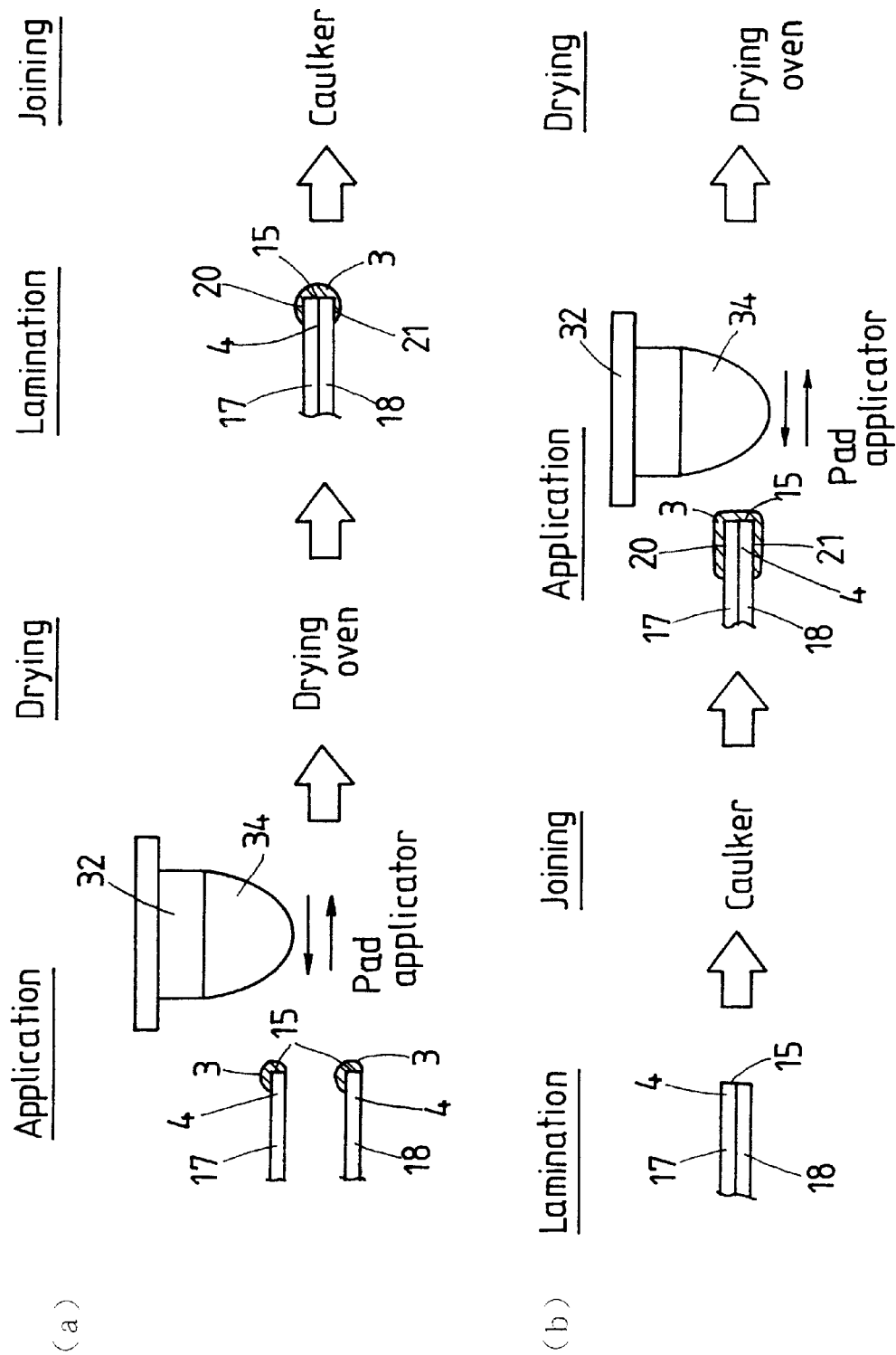
FIG. 6 is a schematic illustration explaining how to apply a deposit of primer or bonding agent to a solid gasket material of the tri-face gasket of the present invention.

Even the embodiments shown in FIGS. 4 and 5, the application of the bonding agent 3 on the tip face 15 of the end lug 4 of the solid gasket material 1 can be accomplished as well with the printing way using the pad applicator shown in FIG. 6. In case the application of primer on the solid gasket material 1 must be considered, other pad applicator for the exclusive use of the primer may be added in the production line. Given appreciate design conditions, it would be allowed to use only the primer as bonding agent alternatives. Moreover, while the embodiments recited earlier are explained as being applied to the solid gasket material 1 composed of metallic beaded plates 17, 18, it will be appreciated that the gasket of the present invention is applicable to a soft cylinder-head gasket or rubber-made solid gasket.

Having described the tri-face gasket in which the solid gasket material 1 is made up of beaded plates 17, 18, the solid gasket material 1 should not be limited in type and material to the beaded plates 17, 18. The solid gasket material 1 may be moreover made of any composite material composed of metals, rubbers and soft substance rather than rubbers. Besides, the solid gasket material 1 may be constituted with a monolayer gasket rather than the laminated gasket comprised of the beaded plates 17, 18. With the embodiments recited earlier, the solid gasket material 1, although serving as the head gasket, may find other applications: an oil pan in engine construction or a container to be hermetically sealed.

The bonding agent 3 is not restrictive in type and property thereof, but selected in type and property in light of the solid gasket material 1 and the fluid gasket material 2. Any bonding agent 3 including, for example the adhesive of acrylics would be sufficient if the adhesive were superior in adhesive property and tight adherence with both the solid gasket material 1 and the fluid gasket material 2. Although the application of the bonding agent 3 on the solid gasket material 1 may be carried out at the time of installation of the gasket to the engine construction, but it is most preferably that the bonding agent 3 has been previously deposited on the solid gasket material 1 during fabrication step of the gasket. Application of the bonding agent 3 on the solid gasket material 1 may be carried out for whether every plate or laminated, bonded plates. Although not shown, it will be moreover optional to apply the primer to the area where the bonding agent 3 is deposited, prior to application of the bonding agent 3 to the solid gasket material 1. In some cases, the primer having a comparatively slight bonding property and adherence may be used in the place of the bonding agent. Among many printing processes, the way using the pad is most preferable for applying the primer and the bonding agent 3 on the solid gasket material 1.

What is claimed is:

1. In a gasket adapted to be disposed in a construction of an engine that is comprised of a first component, a second component confronting the first component through a solid gasket material interposed between the first and second components, and a third component arranged in opposition to flush sides of the first and second components, all the first, second and third components meeting together and coming into abutment against one another to form a tri-face area; the improvement characterized in that a fluid gasket material is filled in the tri-face area while a deposit of bonding agent is applied on an end lug of the solid gasket material, which is placed in the tri-face area, and the fluid gasket material is joined to the solid gasket material with the bonding agent.

2. An improvement as recited in claim 1, characterized in that the end lug of the solid gasket material on which the bonding agent is applied is exposed out of mating surfaces of the first and second components into the tri-face area.

3. An improvement as recited in claim 2, characterized in that the bonding agent is applied on either a tip face or at least one side on the end lug of the solid gasket material.

4. An improvement as recited in claim 2, characterized in that the end lug of the solid gasket material exposed out of the mating surfaces of the first and second components is placed in an area where both the first and second components are cut at their confronting edges to form bevels opposite to one another.

5. An improvement as recited in claim 1, characterized in that the bonding agent is applied previously to the end lug of the solid gasket material, preparatory to installation of the solid gasket material into the construction.

6. An improvement as recited in claim 1, characterized in that the bonding agent and/or a primer to be applied on the solid gasket material is applied with either dipping or printing process.

7. An improvement as recited in claim 1, characterized in that the first component is a cylinder block, the second component is a cylinder head and the third component is a timing-chain housing to be fastened to both the cylinder block and the cylinder head.

8. An improvement as recited in claim 1, characterized in that the first component is a cylinder block, a second component is a front cover fastened to the cylinder block, and the third component is an oil pan joined to the cylinder block.

* * * * *